(12) United States Patent
Tsaparas et al.

(10) Patent No.: US 8,275,726 B2
(45) Date of Patent: Sep. 25, 2012

(54) OBJECT CLASSIFICATION USING TAXONOMIES

(75) Inventors: Panayiotis Tsaparas, Palo Alto, CA (US); Panagiotis Papadimitriou, Santa Cruz, CA (US); Ariel D. Fuxman, Mountain View, CA (US); Lise C. Getoor, Takoma Park, MD (US); Rakesh Agrawal, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 727 days.

(21) Appl. No.: 12/414,065

(22) Filed: Mar. 30, 2009

(65) Prior Publication Data

US 2010/0185577 A1    Jul. 22, 2010

Related U.S. Application Data

(60) Provisional application No. 61/145,419, filed on Jan. 16, 2009.

(51) Int. Cl.
*G06E 1/00* (2006.01)
*G06E 3/00* (2006.01)
*G06F 15/18* (2006.01)
*G06G 7/00* (2006.01)

(52) U.S. Cl. .............. 706/20; 706/45; 706/62
(58) Field of Classification Search .............. None
See application file for complete search history.

(56) References Cited

U.S. PATENT DOCUMENTS

| | | | |
|---|---|---|---|
| 4,719,571 A * | 1/1988 | Rissanen et al. ............ 1/1 |
| 5,787,274 A * | 7/1998 | Agrawal et al. ............ 1/1 |
| 6,233,575 B1 * | 5/2001 | Agrawal et al. ............ 1/1 |
| 6,252,597 B1 | 6/2001 | Lokuge |
| 7,401,087 B2 | 7/2008 | Copperman et al. |
| 2001/0037324 A1 * | 11/2001 | Agrawal et al. ............ 707/1 |
| 2006/0190481 A1 * | 8/2006 | Alspector et al. ......... 707/103 R |
| 2007/0083505 A1 | 4/2007 | Ferrari et al. |
| 2008/0235220 A1 | 9/2008 | Chen et al. |

OTHER PUBLICATIONS

Chakrabarti et al. "Using taxonomy, discriminants, and signatures for navigating in text databases", Proceedings of the 23rd VLDB Conference, 1997, 10 pages.*

Boykov et al., "An Experimental Comparison of Min-Cut/Max-Flow Algorithms for Energy Minimization in Vision", In IEEE Transactions on PAMI, vol. 26, No. 9, pp. 1124-1137, Sep. 2004, http://www.csd.uwo.ca/~yuri/Papers/pami04.pdf.

Chuzhoy, et al., "The Hardness of Metric Labeling", Proceedings of the 45th Annual IEEE Symposium on Foundations of Computer Science (FOCS'04) 0272-5428/04 $20.00 © 2004, pp. 1-7, http://ieeexplore.ieee.org/stamp/stamp.jsp?arnumber=1366230&isnumber=29918.

(Continued)

*Primary Examiner* — Omar Fernandez Rivas
(74) *Attorney, Agent, or Firm* — Microsoft Corporation

(57) ABSTRACT

As provided herein objects from a source catalog, such as a provider's catalog, can be added to a target catalog, such as an enterprise master catalog, in a scalable manner utilizing catalog taxonomies. A baseline classifier determines probabilities for source objects to target catalog classes. Source objects can be assigned to those classes with probabilities that meet a desired threshold and meet a desired rate. A classification cost for target classes can be determined for respective unassigned source objects, which can comprise determining an assignment cost and separation cost for the source objects for respective desired target classes. The separation and assignment costs can be combined to determine the classification cost, and the unassigned source objects can be assigned to those classes having a desired classification cost.

20 Claims, 8 Drawing Sheets

OTHER PUBLICATIONS

"Data Engineering", Mar. 1998 vol. 21 No. 1, pp. 1-72, http://74.125.77.132/search?q=cache:waGXTGZ1r4gJ:ftp://ftp.research.microsoft.com/pub/debull/mar98-a4draft.ps+%22scalable+classification%22+taxonomy+product&hl=en&ct=clnk&cd=19&gl=in.

Chaudhuri et al., "Scalable Classification over SQL Databases", pp. 1-10, Retrieved on Jan. 30, 2009, http://ieeexplore.ieee.org/stamp/stamp.jsp?arnumber=754963&isnumber=16304.

"Automatic Classification and Taxonomy Generation", pp. 1-3, Retrieved on Jan. 30, 2009, http://www.autonomy.com/content/Functionality/idol-functionality-categorization/index.en.html.

Chakrabarti et al., "Scalable Feature Selection, Classification and Signature Generation for Organizing Large Text Databases into Hierarchical Topic Taxonomies", May 27, 1998, pp. 163-178, http://citeseerx.ist.psu.edu/viewdoc/download?doi=10.1.1.33.2822&rep=rep1&type=pdf.

Agrawal et al., "On Integrating Catalogs", May 1-5, 2001, pp. 1-10, http://rakesh.agrawal-family.com/papers/www01catalog.pdf.

Bakir et al., "Predicting Structured Data", p. 1, Retrieved on Jan. 30, 2009, http://mitpress.mit.edu/catalog/item/default.asp?ttype=2&tid=11332.

Boykov, et al., "Fast Approximate Energy Minimization via Graph Cuts", pp. 1-8, Retrieved on Jan. 30, 2009, http://www.cs.cornell.edu/rdz/papers/bvz-iccv99.pdf.

Chekuri, et al., "Approximation Algorithms for the Metric Labeling Problem via a New Linear Programming Formulation", Sep. 22, 2000, pp. 109-118, http://repository.upenn.edu/cgi/viewcontent.cgi?article=1075&context=cis_papers.

Doan et al., "Learning to Match Ontologies on the Semantic Web", pp. 1-18, Retrieved on Jan. 30, 2009, http://pages.cs.wisc.edu/~anhai/papers/glue-vldbj.pdf.

Dumais, et al., "Hierarchical Classification of Web Content", pp. 1-8, Retrieved on Jan. 30, 2009, http://research.microsoft.com/en-us/um/people/sdumais/sigir00.pdf.

Jeffery et al., "Pay-As-You-Go User Feedback for Dataspace Systems", Jun. 9-12, 2008, pp. 1-14, http://www.dit.unitn.it/~p2p/RelatedWork/Matching/Jeffery-sigmod08.pdf.

Kleinberg et al., "Approximation Algorithms for Classification Problems with Pairwise Relationships: Metric Labeling and Markov Random Fields", Journal of the ACM, vol. 49, No. 5, Sep. 2002, pp. 1-10., https://eprints.kfupm.edu.sa/26408/1/26408.pdf.

Kolmogorov et al., "What Energy Functions can be Minimized via Graph Cuts?", IEEE Transactions on Pattern Analysis and Machine Intelligence, vol. 26, No. 2, Feb. 2004, pp. 147-159, http://www.cs.cornell.edu/~rdz/Papers/KZ-PAMI04.pdf.

Liu et al., "Support Vector Machines Classification with a Very Large-Scale Taxonomy", vol. 7, Issue 1, pp. 36-43, Retrieved on Jan. 30, 2009, http://research.microsoft.com/en-us/people/tyliu/6-liu.pdf.

Madhavan, et al., "Web-Scale Data Integration: You Can Only Afford to Pay As You Go", 2007, pp. 342-350, http://www.eecs.umich.edu/db/files/cidr07p40.pdf.

Ravikumar et al., "Quadratic Programming Relaxations for Metric Labeling and Markov Random Field Map Estimation", Appearing in Proceedings of the 23 rd International Conference on Machine Learning, Pittsburgh, PA, 2006, pp. 1-8, http://www.cs.cmu.edu/~pradeepr/papers/mapQP.pdf.

Sarawagi et al., "Cross-Training: Learning Probabilistic Mappings between Topics", Aug. 24-27, 2003, pp. 1-10, http://www.cse.iitb.ac.in/~soumen/doc/sigkdd2003/sigkdd2003.pdf.

Sarama et al., "Bootstrapping Pay-As-You-Go Data Integration Systems", Jun. 9-12, 2008, pp. 1-14, http://ilpubs.stanford.edu:8090/851/1/2008-8.pdf.

Udrea et al., "Leveraging Data and Structure in Ontology Integration", Jun. 11-14, 2007, pp. 1-12, http://queens.db.toronto.edu/~miller/papers/UGM07.pdf.

Xue et al., "Deep Classification in Large-Scale Text Hierarchies", Jul. 20-24, 2008, pp. 1-8, http://www.cs.ust.hk/~qyang/Docs/2008/fp350-xue.pdf.

Zhang et al., "Web Taxonomy Integration through Co-Bootstrapping", Feb. 3, 2009, pp. 1-51, http://www.dcs.bbk.ac.uk/~dell/publications/dellzhang_sigir2004.ppt.

Zhang et al., "Web Taxonomy Integration using Support Vector Machines", May 17-22, 2004, pp. 472-481, http://citeseerx.ist.psu.edu/viewdoc/download?doi=10.1.1.2.4539&rep=rep1&type=pdf.

Zhang et al., "Web Taxonomy Integration using Spectral Graph Transducer", 2008, Lecture notes in computer science ISSN 0302-9743, pp. 1-2, Abstract, http://cat.inist.fr/?aModele=afficheN&cpsidt=16334840.

* cited by examiner

OBJECT CLASSIFICATION USING TAXONOMIES

BACKGROUND

Enterprises often maintain a comprehensive "master" catalog that organizes their products or items used in the enterprise, such as a commercial seller of products. The catalog can comprise a taxonomy, for example, which may comprise many nodes of very diverse products, at varying levels of granularity. Typically, a master catalog is maintained in a computer-based database that may comprise the products, product features, and links that organize the taxonomy of the varying products in the catalog.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

An enterprise may wish to add products or items from a provider, such as a new seller of items joining a large online commercial portal. When products or items are added to an enterprise, the provider's catalog can be incorporated in the enterprise's master catalog, thereby requiring the provider's items be incorporated into the master taxonomy. The provider's individual products can be classified in the master taxonomy, and a mapping between the different taxonomies can be provided. However, merging catalogs from two different enterprises can be an inherently difficult problem based on a size of the taxonomy, and a size of the catalogs that are to be classified.

Accuracy of the classification can be improved by exploiting information provided by a structure of the taxonomy of the provider. Intuitively, products that are in "close-by" categories in the provider's taxonomy should be classified in "close-by" categories in the master taxonomy. This idea underlies many "collective classification" approaches, and has been shown to work well in the past. However, most of these approaches suffer from scalability issues due to a large number of pairwise relationships that need to be computed for appropriate merging of the catalogs.

Techniques and systems are disclosed that integrate the catalog of a provider (source) into a master taxonomy (target) of an enterprise, that is, classify the products of the source in the target taxonomy. Scalable collective classification is provided by utilizing information about the taxonomy of the source for the classification in a scalable way. Further, incremental updates to the provider's taxonomy can be performed, such as classifying new products from the provider that did not belong in the original catalog, and improve the quality of the classification as new items are added to the enterprise taxonomy. Additionally, a mapping between the provider and target taxonomies can be performed using the classification results. Also, candidate products for manual labeling can be identified based on the rearrangements imposed by a collective classification.

In one embodiment, a baseline classifier can be used to determine a probability that an object from a source catalog belongs to a class in a target catalog for respective source objects, for example, resulting in a list of target class probabilities for a source object. If a target class probability for a source object meets a desired threshold (e.g., one that allocates a particular error rate), the source object can be assigned to the target class having a desired probability (e.g., highest). For those unassigned source objects, a classification cost can be determined for respective target classes from a set of desired target classes.

Determining a classification cost can comprise determining an assignment cost for respective desired target classes for the unassigned source object, where the assignment cost comprises a function of the probability that the unassigned source object belongs to the target class. In this embodiment, for example, an assignment cost may be a cost of assigning the source object to the target class under consideration, where a lower cost may be preferred. Determining a classification cost can further comprise determining a separation cost of the unassigned source object for respective desired target classes, which can comprise combining a function of distance between a desired target class for the unassigned source object and an assigned source object's target class and a function of similarity between the unassigned source object and the assigned source object.

Further, the assignment cost and separation cost of the source object for respective desired target classes can be combined to determine a classification cost for classifying the source object to a target class, for respective desired target classes. In this embodiment, the unassigned source object can be assigned to a target class corresponding to a desired classification cost (e.g., lowest) for the unassigned source object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
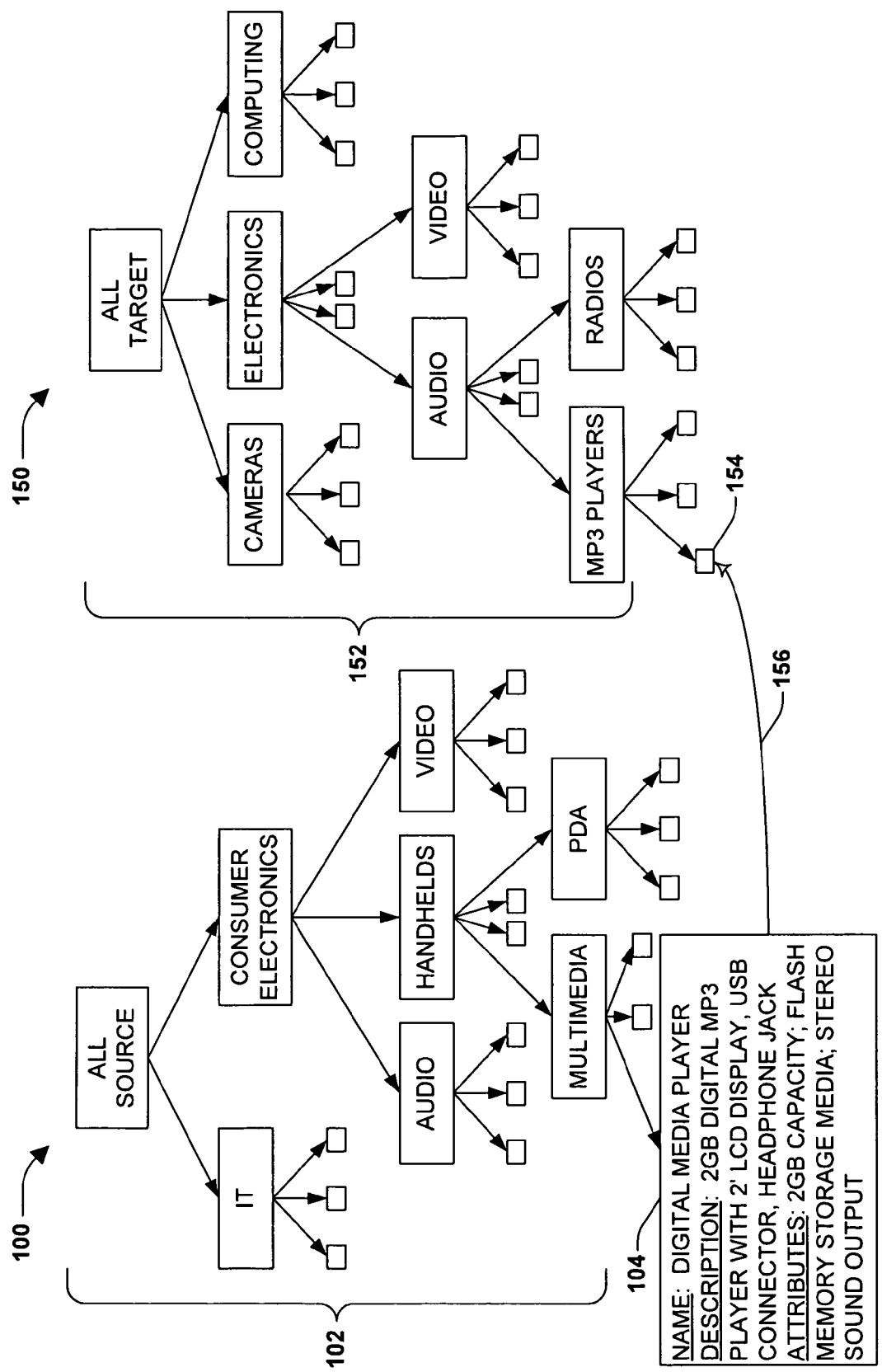
FIG. 1 is a diagram illustrating an exemplary classification between a source and target catalog.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a diagram illustrating one example of how a product may be classified from an exemplary source taxonomy 100 of products, such as from a provider catalog, to an exemplary target taxonomy 150 of products, such as from a master catalog. The exemplary taxonomies 100 & 150 comprise classification nodes 102 & 152, which are arranged in a hierarchical tree.

For example, a first level of the source taxonomy 100 comprises one class, the "all source" node, which comprises all of the products in the source catalog. In this example, the "all source" class comprises two sub-classes, the nodes "IT" and "consumer electronics" in a second level of the source taxonomy 100. Further, the "consumer electronics" class comprises three sub-classes, the nodes "audio", "handhelds", and "video" in a third level of the source taxonomy 100. This example illustrates one embodiment of a hierarchical tree taxonomy, where respective classes of products may comprise sub-classes of products that are more narrowly descriptive of the products than the class above to which they belong, such as "PDAs" being merely one type of "handhelds."

Additionally, FIG. 1 illustrates how two taxonomies 100 & 150 may comprise a differing type and arrangement of nodes 102 & 152. For example, where the source taxonomy's products are divided into two second-level classes, "IT" and "consumer electronics", the target taxonomy's products are arranged into three second-level classes, "cameras", "electronics," and "computing." Further, while the source taxonomy 100 divides "consumer electronics" into three sub-classes, "audio," handhelds," and "video," the target taxonomy uses merely two sub-classes for it "electronics" class. This example illustrates how differing taxonomies may classify similar products into differently named classes in the taxonomy.

In FIG. 1, a digital media player device 104 is classified under the "multimedia" node 102 of the source taxonomy 100. In this example, the classified device 104 comprises a name, description and attributes that may enable an appropriate classification of the device into the source node "multimedia" 102.

If a provider of products wishes to make their products available to an online commercial sales portal, for example, the products may need to be added to the commercial portal's master catalog. In one embodiment, the source taxonomy 100 may be a provider's product catalog, and the target taxonomy 150 may be a commercial portal's master catalog. Because the two taxonomies 100 & 150 utilize different classes as classification nodes 102 & 152, the device 104 will be reclassified 156 to identify an appropriate location 154 in the target taxonomy 150, for example. In this example, the device 104 can be classified 156 utilizing its name, description, and attributes (features) to determine which of the target classes 152 may be appropriate.

Figure 2:
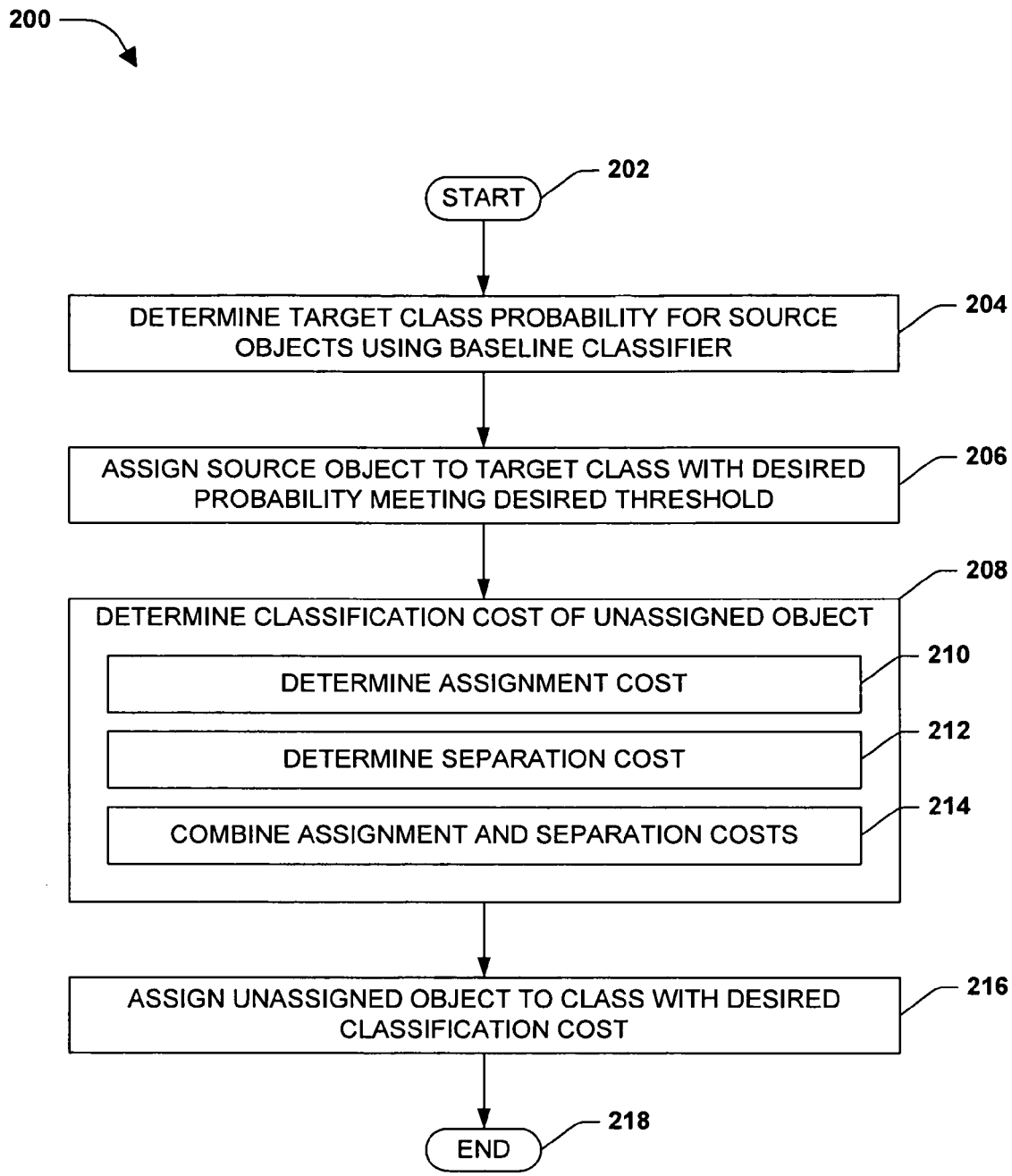
FIG. 2 is a flow chart diagram illustrating an exemplary method for classifying objects from a source catalog to a target catalog.

A method can be devised that improves accuracy of object classification from a source catalog (e.g., a product provider's catalog) to a target catalog (e.g., a sales portal's master catalog), and provides scalability for introducing source catalog objects to a master catalog. FIG. 2 is a flow diagram of an exemplary method 200 for classifying objects from a source catalog to a target catalog, which exploits information provided by classes of products provided by taxonomies of the catalogs, for example.

The exemplary method 200 begins at 202 and involves determining a probability that an object from a source catalog belongs to a class in the target catalog for respective classes in the target catalog using a baseline statistical classification algorithm, at 204. For example, products from a product provider's catalog can be run through a baseline classifier that is not aware of the source taxonomy (e.g., has not been trained to specifically recognize the source taxonomy), such as a Naïve Bayes, logistic regression, support vector machine (SVM), or some other machine learning techniques.

In one embodiment, the baseline classifier can be trained on a sub-set of classes from the target catalog, using product features, such as names, descriptions, and attributes. In this embodiment, for each of the respective objects from the source catalog, the baseline classifier can determine a probability that the object belongs to a class in the target catalog, for each of the target classes. Therefore, an output of the baseline classifier for a source object run through the classifier may be a list of probabilities that correspond to respective target classes, representing a probability that the source object belongs to the target class.

In another embodiment, a baseline classifier may be trained to classify objects into a first level of classes of the target catalog, and other baseline classifiers may be trained for the respective first level classes to classify objects into sub-classes for the respective first level classes of the target catalog. In this embodiment, for example, an object may be run through a first classifier that places it into one of the first-level classes of the target catalog, then run through a second classifier specific to the first-level class chosen by the first classifier.

At 206, in the exemplary method 200, a source object is assigned to a target class having a desired probability, as determined by the baseline classifier, if the probability meets a desired threshold. For example, an output of a classification algorithm can be an estimated likelihood that a product belongs to a class. In one embodiment, for example, the object can be assigned to a class that the baseline classifier has assigned a highest probability that the object belongs in that class, out of the respective classes of the target catalog. In another embodiment, for example, the object may first be assigned to a first-level class having a highest probability from a first classifier, then assigned to a sub-class of the first-level class having a highest probability from a second classifier, as described above.

The target class probability needs to meet a desired threshold in order for the object to be assigned to that target class. In one embodiment, the desired threshold is a parameter that separates those objects that can be assigned to a target class from those objects that remain unassigned after this step. In this embodiment, a desired threshold can be selected based on a level of confidence that the baseline classifier can appropriately classify objects into target classes with little error; and a desire to restrict a number of unassigned objects in order to speed up additional classification steps. In this embodiment, these objectives may be met, for example, by selecting a lowest threshold, below which error can be introduced into the classification.

Figure 3:
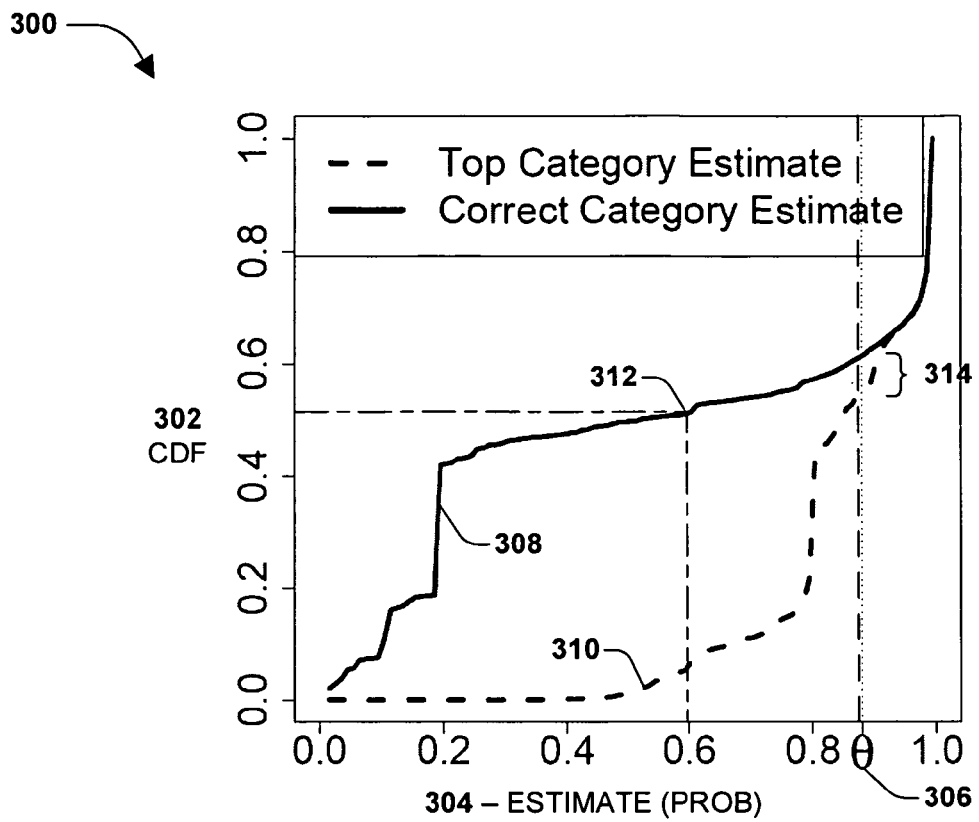
FIG. 3 is an illustration of an exemplary graphical representation of desired threshold evaluation and selection.

FIG. 3 is an illustration of an exemplary graphical representation 300 of desired threshold evaluation and selection. In FIG. 3, cumulative distribution functions 302 (CDFs) are plotted against an estimated probability 304 that an object belongs to a class, for top class 310 (e.g., a group of classes having a highest probability after baseline classification), and for correct classes 308 (e.g., those having a correct classification for an object). As an example, a point on the graph 312 (0.6,0.5) of the solid curve 308 indicates that for half of the objects in a set used to train the classifier, the classifier output probability for the correct class is at least 0.6.

In FIG. 3, a vertical distance 314 between the curves 308 & 310 at a point θ 306 shows an error that may be introduced into the classification if θ 306 is selected as the threshold. In one embodiment, an error threshold of two percent may be acceptable in the classification (e.g., having an accuracy of 98%), for example, thereby setting the threshold value θ 306 at 0.87, in FIG. 3. In this way, in this embodiment, one may select a threshold value for classification based on a tolerable amount of error, compared with an amount of unassigned objects that may increase classification speed.

Turning back to FIG. 2, at 208, a classification cost for assigning an unassigned source object to a target class for respective target classes from a set of desired target classes is determined. In one embodiment, after some source objects have been assigned (fixed) to target classes, a number of unassigned source object may remain. In this embodiment, in order to determine potential target class classifications for the unassigned objects a classification cost can be determined for an object for the respective desired target classes.

In this embodiment, in order to speed up classification, for example, classes used for determining classification cost can be reduced to merely a set of desired classes. The set of desired classes is a sub-set of the set of all the target classes, and can comprise merely those classes having a desired probability for the object, as determined by the baseline classification, described above. For example, a top k classes may be selected, where k is a number that corresponds to a number of target classes that meet an accuracy threshold for object classification, determined when training the baseline classifier. In this example, the k number of classes having a highest probability for the object can be selected as the set of desired classes.

Figure 4:
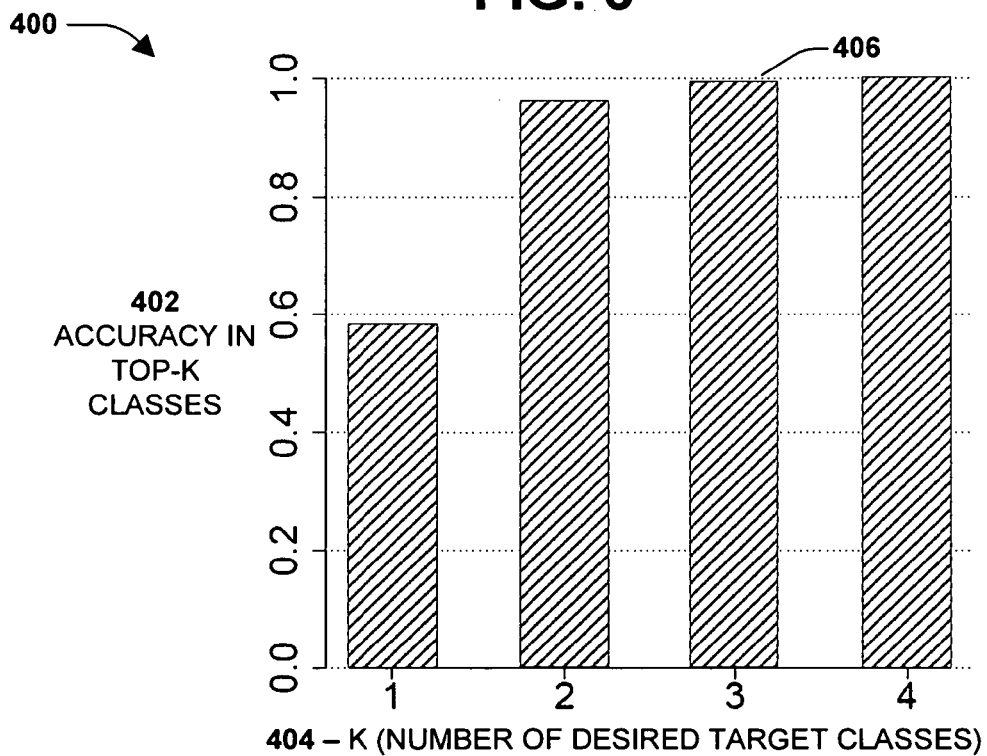
FIG. 4 is an illustration of an exemplary graphical representation of evaluating and selecting a desired set of classes.

FIG. 4 is an illustration of an exemplary graphical representation 400 of evaluating and selecting a desired set of classes. In one embodiment, the graph 400 represents results of applying the baseline classifier to a training set of classes for the target catalog, and calculating an accuracy 402 of the classifier for different values of k 404. In this embodiment, an object may be considered correctly classified if a target class for the baseline classified object appears in the top-k classes output by the classifier, sorted by their probability estimate.

In FIG. 4, the graphical representation 400 has four bars representing one embodiment where a one utilizes four top classes (e.g., having a highest probability for the object) in the target catalog. Bar one 404 shows an accuracy 402 of the classifier if merely the category having the highest probability is selected (e.g., k=1, accuracy=58%). Bar two 404 shows that for approximately 95% of the objects, the correct class is either of the top two highest probabilities output by the classifier. In this embodiment, an accuracy rating of 98% is considered as an accuracy threshold 406, which is achieved when k is equal to three 404. Therefore, in this embodiment, if a set of desired classes is the three target classes having a highest probability for the source object, the subsequent classification is likely to have an approximate error rate of two percent.

Turning back to FIG. 2, determining a classification cost comprises determining an assignment cost for respective desired target classes for the unassigned source object, at 210. An assignment cost comprises a function of the probability that the unassigned source object belongs to the target class. In one embodiment, cost for assigning the unassigned object to a target class, from the set of desired target classes, can be determined by taking the probability determined by the baseline classifier for that target class, and subtracting it from one.

For example, a formula for determining the assignment cost may be represented as: $A(x,l)=1-P(x,l)$, where $P(x,l)$ is the probability that object x belongs to class l, and $A(x,l)$ is the cost of assigning object x to class l (assignment cost). In this example, an assignment cost can be determined for the source object (x) for the respective desired target classes (l), resulting in respective desired target classes having corresponding assignment costs for the source object.

In the exemplary method 200, at 212, determining a classification cost further comprises determining a separation cost of the unassigned source object for respective desired target classes. Determining a separation cost comprises combining a function of distance between a desired target class for the unassigned source object and an assigned source object's target class and a function of similarity between the unassigned source object and the assigned source object.

In one embodiment, a function of distance may be defined by a length of a path between two nodes in a taxonomy. For example, where a hierarchical taxonomy has tree-like structure with parent and children nodes, one may count a number hops between nodes in the hierarchy to determine the function of distance for the nodes. As an example, in FIG. 1, 100, a number of hops between nodes 102 multimedia and video is three; two hops up to consumer electronics, and one hop down to video.

In one embodiment, an exponential decay may be applied to the distance function, for example, so that classes that are far apart may be further penalized. In this embodiment, a function of distance may be represented by the formula: $Dist(l,c)=1-2^{-hops(l,c)}$, where $Dist(l,c)$ is a distance metric between the desired target class (l) for the unassigned source object and the assigned source object's target class (c); and $hops(l,c)$ is a number of hops (e.g., along a shortest path) between the l and c. In this example, zero hops would yield a distance metric of zero, one hop would yield a distance metric of 0.5, two hops would yield a distance metric of 0.75, three hops would yield a distance metric of 0.875, and so on. Therefore, a higher number of hops yields a higher distance metric, in this example.

In one embodiment, the source object can be compared with the respective assigned objects (e.g., those source objects that have already been fixed to a target class), from the set of desired target classes, to determine a function of similarity between them. For example, in order to determine similarity, a distance between source classes that the two objects occupied in the source catalog taxonomy can be identified. As an example, a function of similarity between an unassigned source object and an assigned source object may be represented by the formula: $sim(x,y)=sim(s_x,s_y)=1-Dist(s_x,s_y)$, where $sim(x,y)$ represents the similarity metric between the unassigned source object (x) and the assigned source object (y); $sim(s_x,s_y)$ is a similarity metric between a source class ($s_x$) containing x and a source class ($s_y$) containing y; and $Dist(s_x,s_y)$ is the distance metric between $s_x$ and $s_y$.

In this example, a distance between the source taxonomy nodes containing the unassigned source object and the assigned source object can be determined and used to determine the distance metric for these source classes. Further, the distance metric can be subtracted from one to determine a similarity metric for the source objects. In this example, if the source objects occupied a same node in the source taxonomy, the similarity metric would be one, and if the source objects were one node apart the similarity metric would be 0.5, and so on.

Determining a separation cost for a source object with respect to being assigned to a desired target class can comprise combining the distance metric and separation metric for the source object with respect to the desired target class. In one embodiment, in order to obtain a separation cost for assigning the source object to the desired target class, a similarity metric and distance metric is determined for the respective assigned objects with respect to the desired target class. Further, in this embodiment a sum of the combination of the similarity metric and distance metric for the respective assigned objects with respect to the desired target class is taken.

As an example, a formula for determining a separation cost ($S(x,l)$) for assigning a source object (x) to a desired target class (l) can be represented as follows:

$$S(x, l) = \sum_{y \in F} sim(x, y) dist(l, t_y),$$

where y is an assigned source object belonging to a set of assigned source objects (F); and $t_y$ is a target class of object y. In this example, for respective assigned objects and their target classes, a similarity to the unassigned object is determined, along with a distance between the desired target class and the assigned object target class. A sum of the combination of the respective similarity and distance metrics is determined and represents a separation cost for assigning the source object (x) to the desired target class (l).

In another embodiment, a normalization factor ($Z_{x,y}$) may be introduced into the formula for determining a separation cost, for example, $$S(x, l) = \sum_{y \in F} \frac{1}{Z_{x,y}} sim(x, y) dist(l, t_y),$$

In this example, the normalization factor depends on the specific assigned source object y.

Using a normalization factor can provide compensation for an uneven distribution of objects in a taxonomy tree. For example, some classes may comprise a greater amount of objects than others. In this example, if a normalization factor is not used in the above formula, a class with many objects may pull in most of the unassigned objects due to the large number of objects in the class. One example of a normalization factor can be formulated as follows: $Z_{S_x,s} = |R_{S_x}(hops(s_x,s))|$, where $R_{S_x}(hops(s_x,s))$ is a set of objects that are at a distance (h)=hops($s_x$,s) from object x in the source taxonomy tree.

In the exemplary method 200 of FIG. 2, at 214, determining a classification cost further comprises combining the assignment cost and separation cost of the source object for respective desired target classes. In one embodiment, the assignment cost and separation cost may be summed to obtain a classification cost, for example, $C(x,l)=A(x,l)+S(x,l)$, where $C(x,l)$ is the classification cost for assigning the unassigned source object (x) to a desired target class (l); and $A(x,l)$ and $S(x,l)$ are the assignment cost, as described above. In this embodiment, a classification cost for an unassigned source object can be determined for the respective target classes in the set of desired target classes, resulting in set of classification costs corresponding to target classes.

In another embodiment, a regularization factor may be introduced into the combination of the assignment cost and separation cost. In one embodiment, a regularization factor can be utilized to mitigate overfitting, when attempting to fit the classification model that may have too many parameters. For example, a model may only fit if it contains enough complexity; however, obtaining that complexity may be extremely inefficient. As an example of utilizing a regularization factor ($\gamma$) in this embodiment, the following formula may be used to determine classification cost of an unassigned source object (x) to a target class (l): $C(x,l)=A(x,l)+\gamma S(x,l)$.

In the exemplary method 200, at 216, the unassigned source object can be assigned to a target class having a desired classification cost for the unassigned source object. As described above, a classification cost is determined for the unassigned object with respect to the target classes from the set of desired target classes. In one embodiment, the desired (e.g., minimum) target class having a lowest classification cost for the unassigned source object can be selected. Further, in this embodiment, now that the formerly unassigned source object has been assigned to a target class, it can be added to a set of assigned objects.

I will be appreciated that, while the embodiments above describe determining assignment costs, similarity and distance metrics, separation costs, and classifications costs using example formulas and calculations, the techniques and systems described herein are not limited to these embodiments. It is anticipated that those skilled in the art may devise alternate embodiments for determining the features described above. Some of the embodiment describe utilize common statistical analysis, however the exemplary methods use a combination of analysis, described herein, that provide a novel approach to classifying objects from a source catalog to a target catalog.

Figure 5:
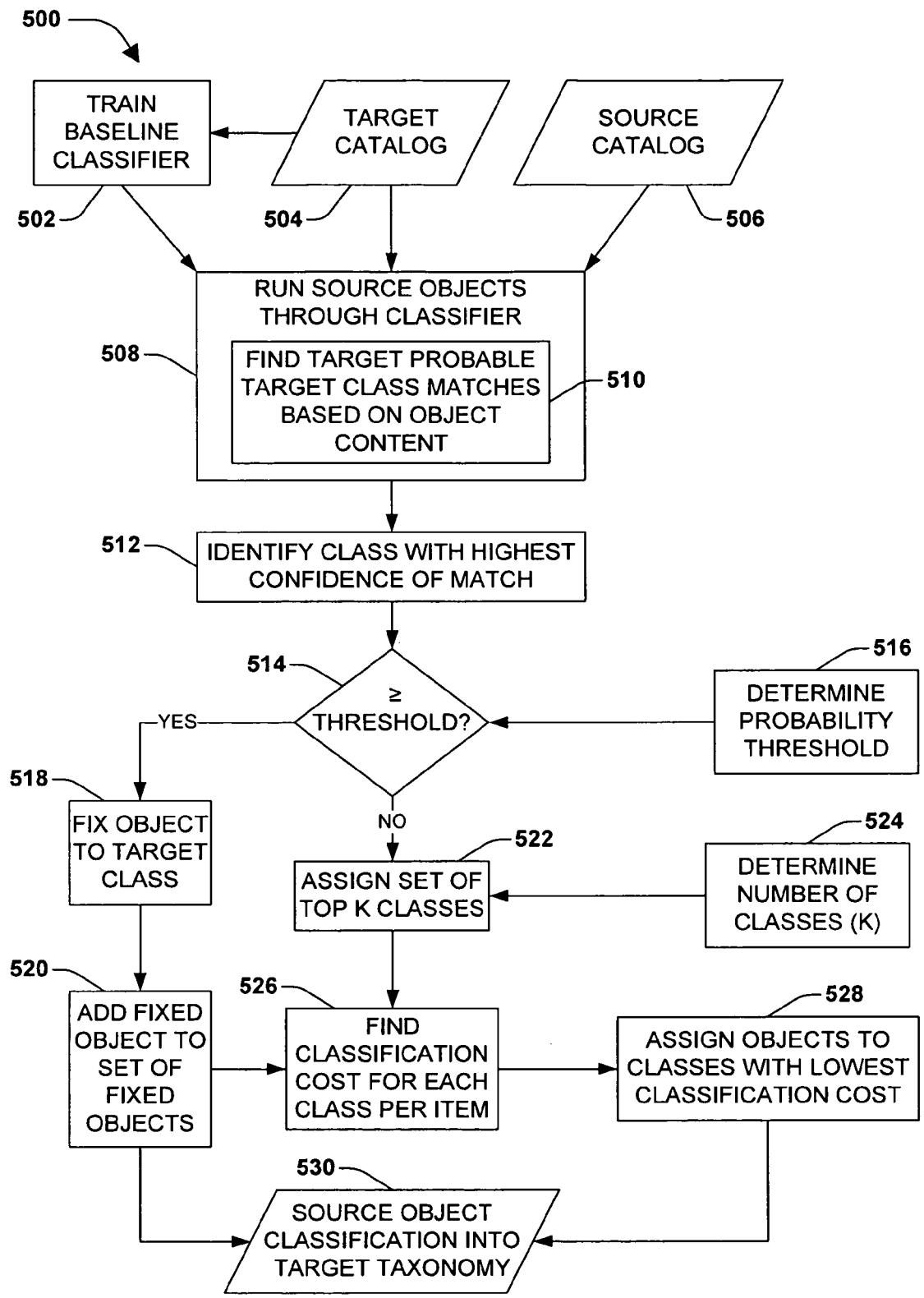
FIG. 5 is a flow chart diagram illustrating an exemplary implementation of classifying objects from a source catalog to a target catalog.

FIG. 5 is a flow chart diagram illustrating an exemplary implementation 500 of classifying objects from a source catalog to a target catalog. At 502, a baseline classifier, such as a Naïve Bayes, logistic regression, support vector machine (SVM), or other learning classification machine, is trained on the target catalog 504 using a subset of the target catalog's classes. In this way, for example, the baseline classifier can be trained to determine class probabilities for objects based on the object's features.

In this embodiment, the respective objects from the source catalog 506 are run through the trained baseline classifier, at 508. A source object comprises features in its content as stored in the source catalog, such as the object name, description, and attributes. As the baseline classifier has been trained on the target catalog 504 based on features of the target classes, at 510, target class probable matches can be identified by the baseline classifier based on a source object's content. A probability that the source object belongs to a target class is determined by the baseline classifier for the respective target classes.

At 512, a target class having a highest probability for the source object is selected for respective source objects. If the probability determined by the baseline classifier is equal to or greater than a desired probability threshold, at 514, the source object is fixed to that class, at 518. As described above, a threshold can be determined, at 516, based on a desired potential error rate for the fixing of a source object to a target class. For example, if a ninety eight percent accuracy rating is chosen, a threshold value can be determined based on this chosen rating. Once a source object is fixed to a target class, it can be added to a set of fixed objects, at 520.

If the probability determined by the baseline classifier is less than the desired probability threshold, at 514, a top k number of target class is assigned for the source object. As described above, a k number of classes can be determined 524 for the target catalog based on a tolerable error threshold. For example, the five target classes having a highest probability determined by the baseline classifier for the object may be assigned to the source object.

At 526, for those source objects that have not been fixed to a target class, a classification cost can be determined. As described above, an assignment cost can be determined for the source object for the respective top k classes, and a separation cost can be determined for the respective top k classes by using the fixed object set. At 528, the source objects that are not previously fixed to a target class can be assigned to a target class having a lowest classification for the source object. Now that the respective source objects have either been fixed to target classes, at 518, or assigned to a target class at 528, the source objects can be classified into the target taxonomy, at 530.

In one aspect, the techniques described above, comprise a scalable approach to classifying objects from a source catalog to a target catalog. Previous approaches are limited by specifically accounting for pairwise interactions between elements, which incurs a quadratic cost in the classification. Here, classification can be fixed to a limited number of entries (e.g., those chosen by the classifier), and then accounting for interactions between the unclassified objects and the fixed classes, thereby reducing a number of calculations used in the classification algorithm, allowing for a faster classification.

Further, in this aspect, classification of object from the source catalog to a target catalog is linear. Respective source objects can be classified in a linear fashion (e.g., as they come in or from a list) instead of as a group of objects. In this way, data storage of objects undergoing classification is mitigated, as once an object is classified it may not be utilized again in the classification process. Additionally, as described above, the produced classifications, and associations between the source and target taxonomies, can be used to produce a mapping between nodes of the different taxonomies. In this way, in one embodiment, the object classification can be improved to a point where use the second classification step may be mitigated.

Figure 6:
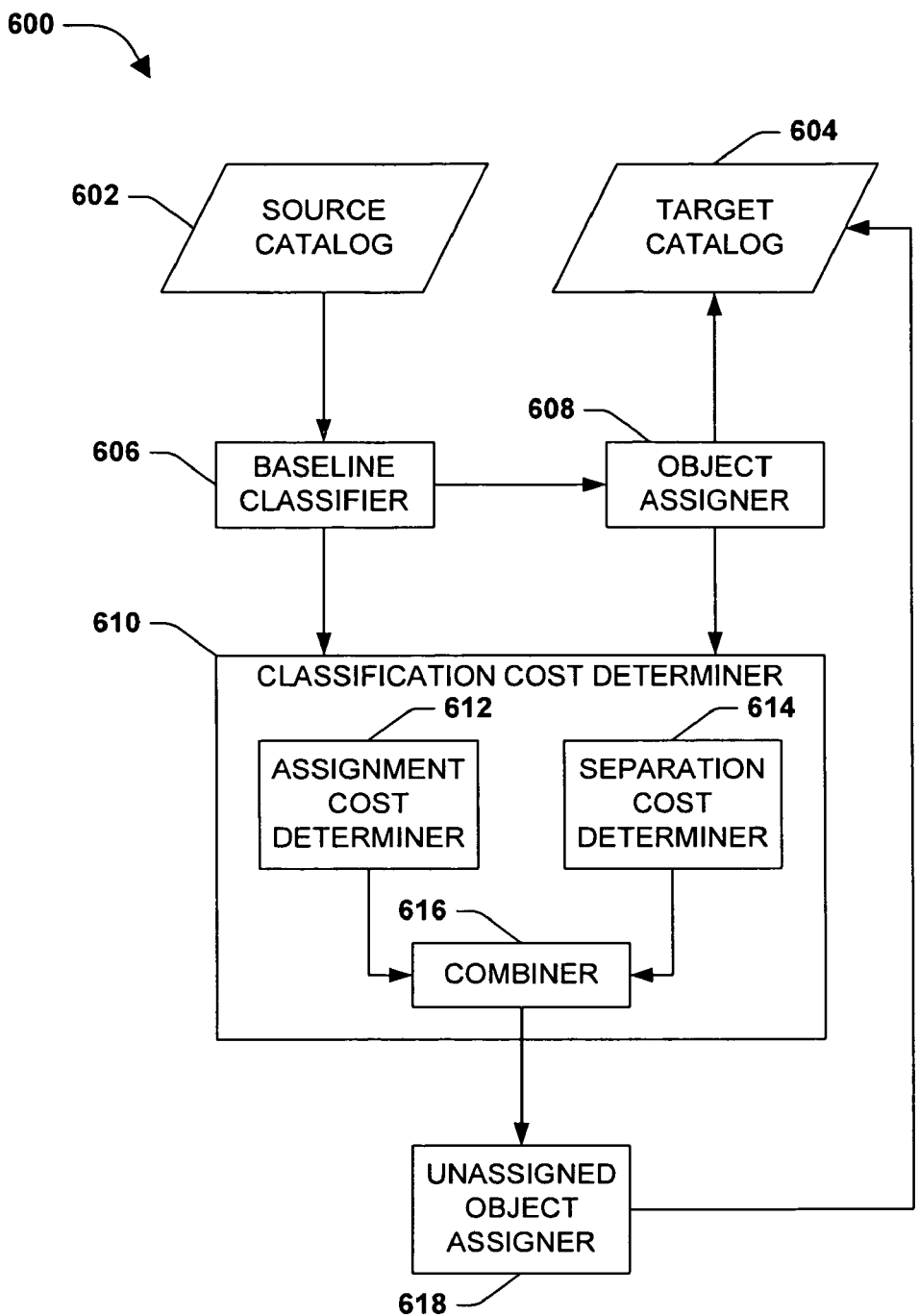
FIG. 6 is a component block diagram illustrating an exemplary system for classifying objects from a source catalog to a target catalog.

A system can be devised that may be used to merge products from a provider's catalog into a master catalog, for example. FIG. 6 is a component block diagram of an exemplary system 600 for classifying objects from a source catalog to a target catalog. The exemplary system 600 comprises a baseline classifier 606, which is configured to determine a probability that an object from a source catalog 602 belongs to a class in a target catalog 604 for respective classes in the target catalog 604. For example, the respective products in a provider's catalog can be run through the baseline classifier 606, and the baseline classifier 602 can produce a probability value for the respective target catalog classes that the source object belongs in that target class.

The exemplary system 600 further comprises an object assignment component 608 configured to assign a source object to a target class corresponding to a desired probability for the source object if the desired probability meets a desired threshold. Those objects from the source catalog 602 that have a target class probability above a threshold, as determined by the baseline classifier 606, can be assigned to the corresponding target class. Those objects whose target class probabilities do not meet the probability threshold will not be assigned to a target class, but sent to a classification cost determiner 610.

The exemplary system 600 further comprises the classification cost determination component 610, which is configured to determine a classification cost of an unassigned source object for respective target classes from a set of desired target classes. In this embodiment, the classification cost determination component 610 comprises an assignment cost determination component 612 that is configured to determine an assignment cost for assigning a previously unassigned source object to a desired target classes for the respective desired target classes.

The assignment cost comprises a function of a probability that the unassigned source object belongs to a desired target class. In one embodiment, a desired set of target classes are selected for a source object, and a function of probability that the source object belongs to the desired target class is determined for the respective desired target classes. For example, the probability determined by the baseline classifier 606 for the class can be subtracted from one to obtain the function of probability. The assignment cost for respective classes is sent to a combination component 616.

The classification cost determination component 610 further comprises a separation cost determination component 614 that is configured to determine a separation cost for an unassigned source object for the respective desired target classes. In this embodiment, the separation cost comprises a combination of a function of similarity between the unassigned source object and an assigned source object and a function of distance between a desired target class for the unassigned source object and the assigned source object's target class. For example, an unassigned source object is compared with respective assigned source objects that had been previously assigned by the object assigner 608. A similarity function between the objects is determined by looking at their position in the source catalog 602, for example; and a distance function is determined by looking at the objects' target classes, for the respective desired target classes. The separation cost is sent to the combination component 616.

The classification cost determination component 610 further comprises the combination component 616, which is configured to combine the assignment cost and separation cost of respective source objects for respective desired target classes. For example, for each of the desired target classes selected for the unassigned source object, a classification cost can be determined by summing the assignment cost and separation cost. In another embodiment, a regularization factor may be combined with the separation cost before combining with the assignment cost.

The exemplary system 600 further comprises an unassigned object assignment component 618, which is configured to assign unassigned source objects to corresponding target classes that have a desired classification cost. For example, in one embodiment, the unassigned source object can be assigned to the target class that has a lowest classification cost by the unassigned object assignment component 618. In this way, in this example, the lowest classification cost may indicate that the class has a highest probability with a closest similarity and distance.

In one embodiment, the unassigned object can be sent to the target catalog and classified into the assigned target class from the unassigned object assignment component 618. Those source object previously assigned by the object assigner 608 can also be classified into the target catalog 604, thereby populating the target catalog with the source catalog objects, for example.

Figure 7:
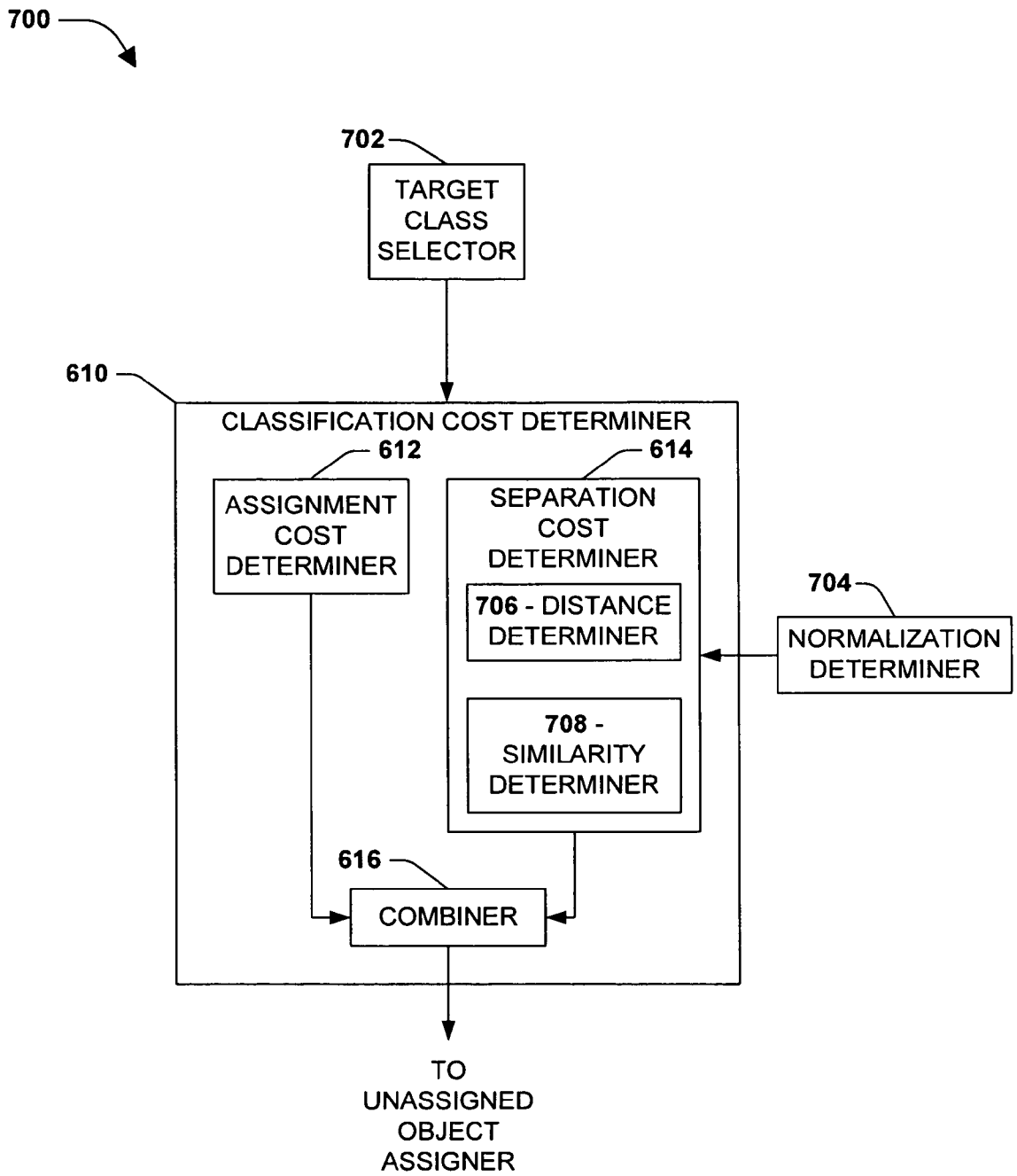
FIG. 7 is a component block diagram illustrating an exemplary system for classifying objects from a source catalog to a target catalog.

FIG. 7 is a component block diagram of an exemplary alternate embodiment 700 of the exemplary system of FIG. 6. The exemplary embodiment 700 comprises a desired target class selection component 702, which is configured to select a number of desired target classes for an unassigned source object. In one embodiment, the desired target classes can correspond to a number of classes that meets an accuracy threshold for a set of desired target classes object classification, which can be determined, for example, when training the baseline statistical classification algorithm for the source catalog. Alternately, a baseline classifier can be trained using all of the respective classes in the target taxonomy.

For example, when the baseline classifier is trained using a subset of target classes, as described above, it may be determined how many classes are needed to reach a particular desired accuracy rating for classifying unassigned source objects. A desired number of classes (k) can be determined and sent to the classification cost determiner 610, for example, where a k number of target classes can be selected that have a highest probability of the source object belonging to a target class. In this embodiment, the set of desired target classes may be used by the assignment cost determiner 612, separation cost determiner 614, and combination component 616.

In the exemplary embodiment 700, the separation cost determination component 614 comprises a distance determiner 706 configured to determine a function of a number of node hops from the target class for the unassigned source object to the assigned source object's target class in a hierarchical taxonomy tree of target classes. For example, the distance determiner 706 may count a number of hops between the target classes and use it to determine a distance metric, to be used by the separation cost determination component 614 to determine a separation cost for the target class, as described above.

The separation cost determination component 614 further comprises a similarity determiner 708 that is configured to determine a similarity between the unassigned source object's source class and the assigned source object's source class from the source catalog. For example, the similarity determiner 708 can determine a distance between the objects in the source catalog to calculate a similarity metric, to be used by the separation cost determination component 614 to determine a separation cost for the target class, as described above.

Further, this exemplary embodiment 700 comprises a normalization factor determination component that is configured to determine a normalization factor. The normalization factor can be used by the separation cost determination component 614 to compensate for an uneven distribution of objects in a hierarchical taxonomy tree when combining the function of similarity and the function of distance of source objects for desired target classes. For example, the normalization factor can be combined with the separation metric and distance metric for the respective target classes for an object to determine the separation cost.

Figure 8:
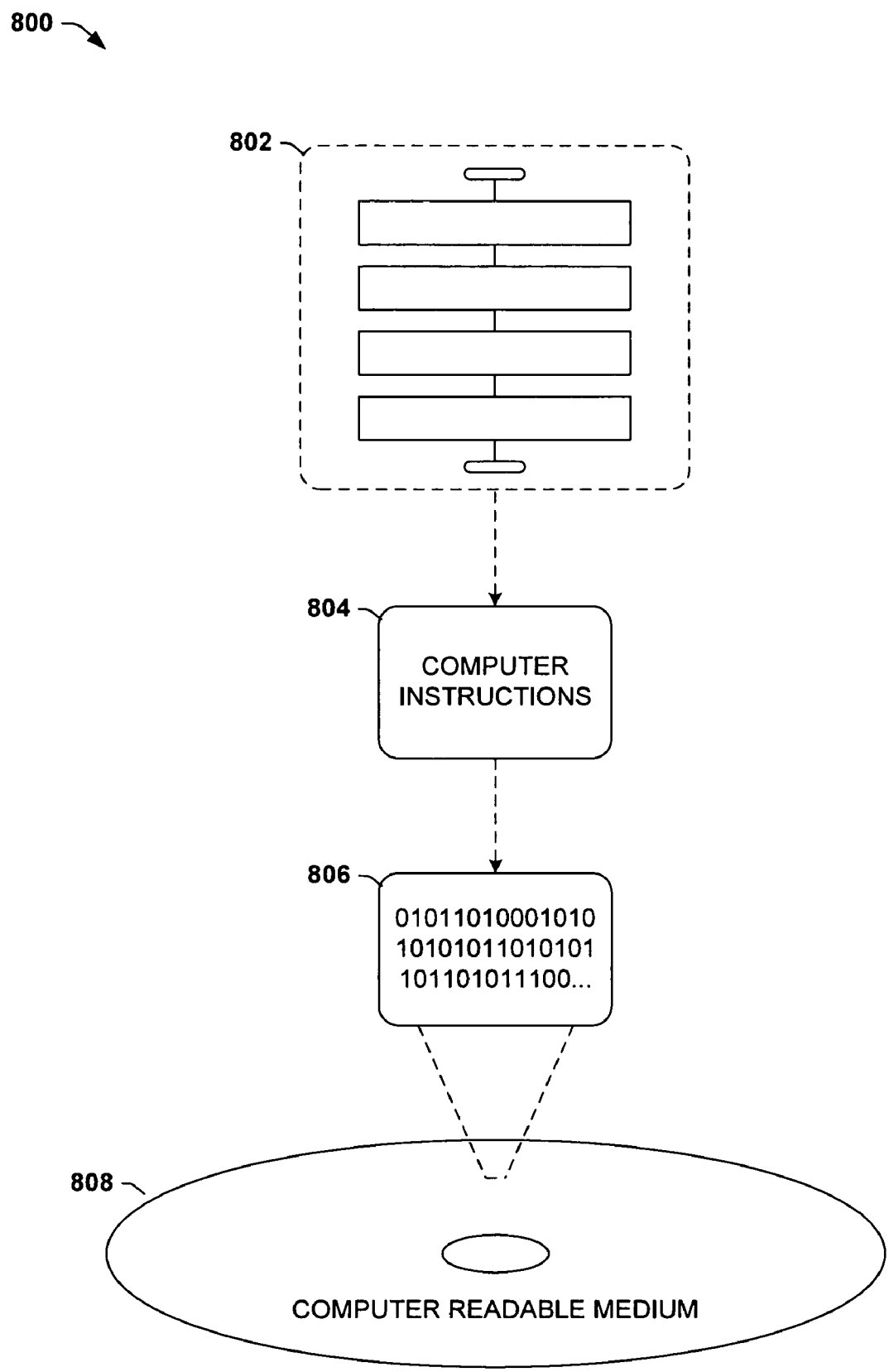
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 200 of FIG. 2, for example. In another such embodiment, the processor-executable instructions 804 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
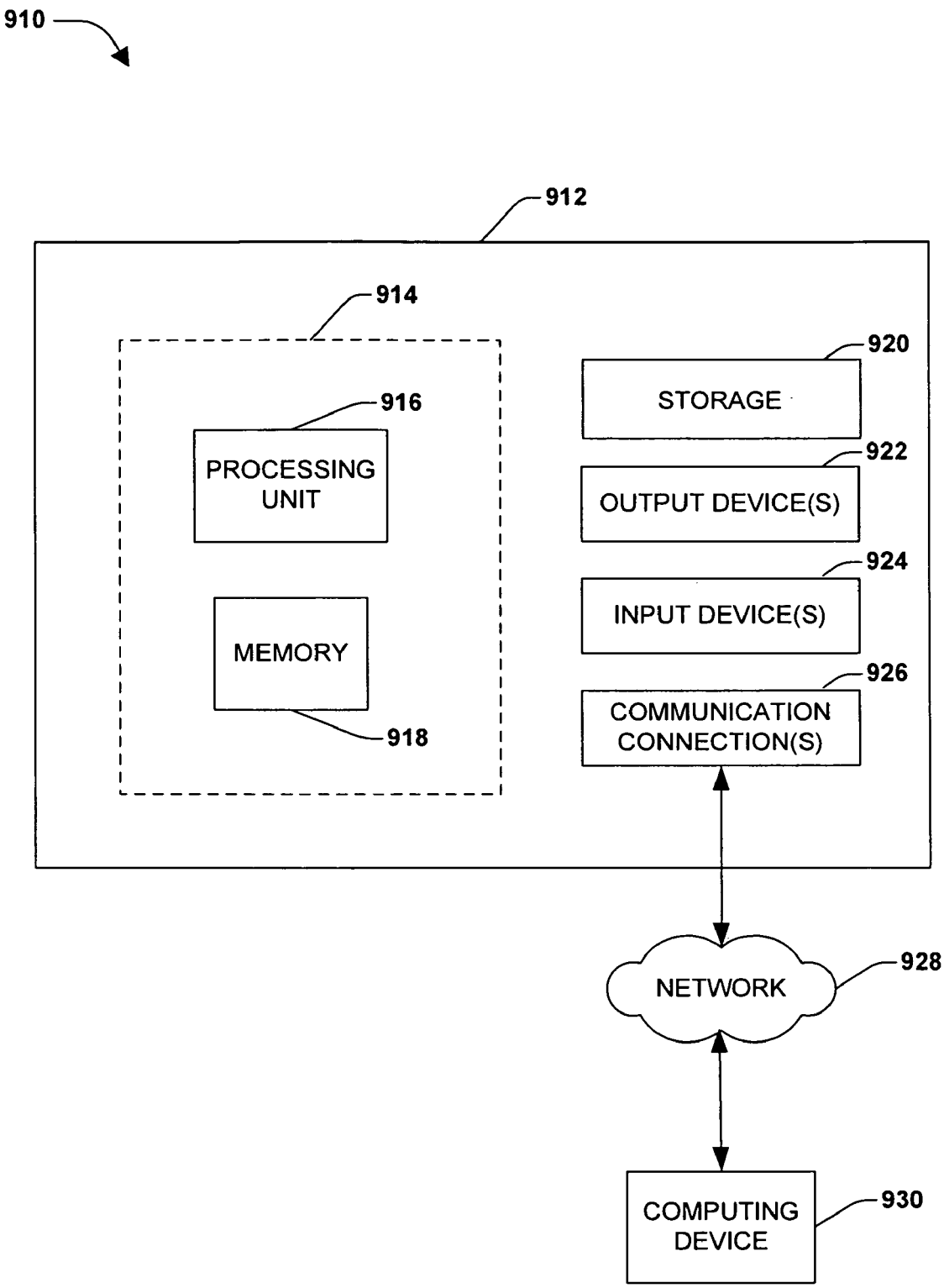
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for classifying an object from a source catalog to a target catalog, comprising:
   determining a probability that an object from a source catalog belongs to a class in a target catalog using a baseline statistical classification algorithm;
   assigning the object to the class if the probability meets a desired threshold; and
   responsive to the probability not meeting the desired threshold:
      determining a classification cost for the object, comprising:
         determining an assignment cost for assigning the object to a second class in the target catalog, the assignment cost a function of a probability that the object belongs to the second class;
         determining a separation cost for the object based on:
            a distance between the second class and a third class, in the target catalog, of a second object; and
            a similarity between the object and the second object; and
         combining the assignment cost and the separation cost to determine the classification cost; and
      determining whether to assign the object to the second class based on the classification cost.

2. The method of claim 1, the baseline statistical classification algorithm associated with at least one of Naïve Bayes, logistic regression, or support vector machine.

3. The method of claim 1, the desired threshold comprising a probability value that yields a desired object assignment error rate when training the baseline statistical classification algorithm.

4. The method of claim 1, the source catalog comprising a different size than the target catalog.

5. The method of claim 1, the probability that the object belongs to the second class determined using the baseline statistical classification algorithm.

6. The method of claim 1, the assignment cost ($A(x,l)$) for assigning the object ($x$) to the second class ($l$) comprising:

$$A(x,l)=1-P(x,l)$$

where $P(x,l)$ is a probability that $x$ belongs in $l$.

7. The method of claim 1, the distance between the second class and the third class corresponding to a number of node hops from the second class to the third class.

8. The method of claim 1, the distance (dist) between the second class ($l$) and the third class ($t_y$) comprising:

$$dist(l,t_y)=1-2^{-hops(l,t_y)}$$

where $hops(l,t_y)$ is a number of node hops from the second class ($l$) to the third class ($t_y$).

9. The method of claim 1, the similarity between the object and the second object determined based on a similarity between the second class and the third class.

10. The method of claim 9, the similarity between the second class and the third class determined based on the distance between the second class and the third class.

11. The method of claim 1, comprising combining a function of similarity (sim) between the object ($x$) and the second object ($y$) and a function of distance (dist) between the second class ($l$) and the third class ($t_y$) comprising:

$$S(x,l) = \sum_{y \in F} \frac{1}{Z_{x,y}} sim(x,y) dist(l,t_y)$$

where $S(x,l)$ is a separation cost for assigning $x$ to $l$, $Z_{x,y}$ is a normalization factor, and $F$ is a set of assigned source objects.

12. The method of claim 1, combining the assignment cost and the separation cost comprising:
   summing the assignment cost and the separation cost; and
   combining a regularization parameter with the sum of the assignment cost and the separation cost.

13. The method of claim 1, comprising assigning the object to the second class if the classification cost is lower than one or more classification costs associated with one or more other classes.

14. The method of claim 1, the separation cost determined based on a combination of a normalization factor with the similarity and the distance, the normalization factor comprising a function that compensates for an uneven distribution of objects in a hierarchical taxonomy tree.

15. The method of claim 1, comprising training the baseline statistical classification algorithm with one or more objects that are assigned to one or more classes using one or more classification costs.

16. A system for classifying an object from a source catalog to a target catalog, comprising:
   a baseline classifier configured to determine a probability that an object from a source catalog belongs to a class in a target catalog;
   an object assignment component configured to assign the object to the class if the probability meets a desired threshold;
   a classification cost determination component configured to determine a classification cost for the object, comprising:
      an assignment cost determination component configured to determine an assignment cost for assigning the object to a second class in the target catalog, the assignment cost a function of a probability that the object belongs to the second class;
      a separation cost determination component configured to determine a separation cost for the object based on:
         a distance between the second class and a third class, in the target catalog, of a second object; and
         a similarity between the object and the second object; and
      a combination component configured to combine the assignment cost and the separation cost to determine the classification cost; and
   an assignment component configured to determine whether to assign the object to the second class based on the classification cost, at least some of at least one of the baseline classifier, the object assignment component, the classification cost determination component, or the assignment component implemented at least in part via a processing unit.

17. The system of claim 16, at least one of the source catalog or the target catalog comprised in a computer-based database.

18. The system of claim 16, the classification cost determination component configured to determine the classification cost for the object responsive to the probability not meeting the desired threshold.

19. The system of claim 16, comprising a normalization factor determination component configured to determine a normalization factor used by the separation cost determination component to compensate for an uneven distribution of objects in a hierarchical taxonomy tree.

20. A computer storage medium comprising instructions that when executed perform a method for classifying an object from a source catalog to a target catalog, comprising:
   determining a classification cost for an object, comprising:

determining an assignment cost for assigning the object to a class in a target catalog, the assignment cost a function of a probability that the object belongs to the class;

determining a separation cost for the object based on:

a distance between the class and a second class, in the target catalog, of a second object; and a similarity between the object and the second object; and combining the assignment cost and the separation cost to determine the classification cost; and determining whether to assign the object to the class based on the classification cost.

* * * * *